(12) United States Patent
Gaydarov et al.

(10) Patent No.: US 12,709,005 B2
(45) Date of Patent: Aug. 18, 2026

(54) ROBOT PLANNING FOR CONCURRENT EXECUTION OF ACTIONS

(71) Applicant: Intrinsic Innovation LLC, Mountain View, CA (US)

(72) Inventors: Stoyan Gaydarov, Burlingame, CA (US); Scott Christopher Randolph, Aptos, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 674 days.

(21) Appl. No.: 17/831,302

(22) Filed: Jun. 2, 2022

(65) Prior Publication Data

US 2023/0390926 A1 Dec. 7, 2023

(51) Int. Cl.
*B25J 9/16* (2006.01)

(52) U.S. Cl.
CPC .................................. *B25J 9/1661* (2013.01)

(58) Field of Classification Search
CPC ...... B25J 9/1664; B25J 9/1661; B25J 9/1682; B25J 9/1666; G05B 2219/39146
See application file for complete search history.

(56) References Cited

U.S. PATENT DOCUMENTS 7,383,100 B2 6/2008 Ng-Thow-Hing
9,821,455 B1 * 11/2017 Bareddy ................ G06Q 10/06
10,452,441 B1 10/2019 Subramanian
2012/0185100 A1 7/2012 Strohbach
2017/0210008 A1 * 7/2017 Maeda .................. B25J 9/1682
2019/0337154 A1 * 11/2019 Holson .................. B25J 9/1697
2020/0338733 A1 * 10/2020 Dupuis ................ G05D 1/6987
2020/0398428 A1 * 12/2020 Murray ................. B25J 9/1605
2021/0170575 A1 6/2021 Shen
2021/0197377 A1 7/2021 Gaschler
(Continued)

FOREIGN PATENT DOCUMENTS

CN 11303785 1/2022
JP 2021154481 10/2021
(Continued)

OTHER PUBLICATIONS

U.S. Appl. No. 16/727,024, Gaschler, Robot plan online adjustment, filed Dec. 26, 2019, 42 pages.
(Continued)

*Primary Examiner* — Khoi H Tran
*Assistant Examiner* — Tristan J Greiner
(74) *Attorney, Agent, or Firm* — Fish & Richardson P.C.

(57) ABSTRACT

Methods, systems, and apparatus, including computer programs encoded on computer storage media, for robotics planning. One of the methods comprises receiving data defining multiple skills to be performed by one or more robots in an operating environment; invoking a projection function implemented by a skill, wherein the projection function generates a skill footprint representing resources requested for performing the skill and a volume occupied by a corresponding entity used to perform the skill; determining that an initial skill footprint generated by the projection function conflicts with a skill footprint of another skill already being executed; and in response, reinvoking the projection function with data representing the skill footprint of the other skill already being executed.

20 Claims, 19 Drawing Sheets

World State at planning time

Plan State

(56) References Cited

U.S. PATENT DOCUMENTS

| | | | | |
|---|---|---|---|---|
| 2021/0200219 | A1* | 7/2021 | Gaschler | G05D 1/0274 |
| 2021/0362333 | A1 | 11/2021 | Kolluri | |
| 2023/0068058 | A1 | 3/2023 | Sato | |
| 2023/0182295 | A1 | 6/2023 | Beardsworth | |
| 2023/0306334 | A1 | 9/2023 | Li | |

FOREIGN PATENT DOCUMENTS

| | | |
|---|---|---|
| KR | 20230012057 | 1/2023 |
| WO | WO 2015141291 | 9/2015 |

OTHER PUBLICATIONS

U.S. Appl. No. 16/880,869, Kolluri et al., Simulated local demonstration data for robotic demonstration learning, filed May 21, 2020, 85 pages.

U.S. Appl. No. 17/551,706, Beardsworth et al., Sampling for robotic skill adaptation, filed Dec. 15, 2021, 27 pages.

* cited by examiner

ROBOT PLANNING FOR CONCURRENT EXECUTION OF ACTIONS

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which one or more robots will operate. Workcells have particular physical properties, e.g., physical dimensions that impose constraints on how robots can move within the workcell. Thus, a manually programmed schedule for one workcell may be incompatible with a workcell having different robots, a different number of robots, or different physical dimensions.

Further, generating a schedule for operating one or more robots while avoiding any potential conflicts when following the schedule remains a challenge to manual programming. For example, in the case of multi-robot planning, conflicts may occur when two or more robots are assigned to perform the same action. Even when assigned to perform different actions, conflicts may still occur when the two or more robots both approach an overlapping region in a workcell, use a common tool, or both at the same time. As another example, in the case of single robot planning, conflicts may occur when a group of sequential actions are assigned to a robot for concurrent execution, i.e., when the robot is scheduled to simultaneously perform two or more actions where in fact a preceding action is the prerequisite for a subsequent action. In either example, the ability of the robots in performing the given tasks may be impacted.

SUMMARY

This specification describes how a system can generate skill plans that facilitate concurrent execution of multiple skills to improve efficiency, while ensuring any skills concurrently executed by multiple robots in a workcell do not conflict with each other.

In some examples, the system can receive data defining multiple skills that were generated offline. For each skill, the system can obtain, i.e., receive or generate, a skill footprint for each skill and use the skill footprint for deconfliction evaluation, i.e., to ensure the one skill will not conflict with another skill during online execution by the one or more robots. The system can then generate a conflict-free skill plan for concurrently executing some or all of the multiple skills as a result of the deconfliction evaluation.

In some examples, the system can receive an initial skill plan that was generated offline. The initial skill plan can include moving each of the one or more robots to perform a respective task. As a result of the deconfliction evaluation, the system may determine that the initial skill plan can (or should) be modified during online operation. For example, the system can determine that a skill included in the initial skill plan may be performed concurrently and without interfering with another skill within the same workcell. Correspondingly, the system can generate a modified skill plan including concurrent skill execution that, when given to the robots for execution, can reduce the overall amount of time that is required for performing the skills included in the skill plan.

In this specification, a skill template, or for brevity, a skill, refers to a collection of software and data that defines parameters of a task and which provides the mechanisms for automatically adapting a robot installation to complete the task. Skills are designed to be highly modular and reusable so that a skill can be developed by one organization and used by another organization without the organizations having a preexisting relationship and without coordinating their activities.

In this specification, a skill plan is a data structure that provides information for executing one or more skills by one or more robots. In some implementations, this information includes the assignment of different tasks to one or more robots, as well as the order in which the different skills are to be executed by the one or more robots. For example, a skill plan can specify that a first skill is assigned to a first robot for execution, a second skill is assigned to a second robot for execution, and the first and second skills will be executed concurrently (or sequentially) by the first and second robots, respectively. In some implementations, a skill plan is generated in the form of a dependency graph that represents dependencies of multiple skills toward each other.

In this specification, a task refers to a capability of a particular robot that involves performing one or more actions (or subtasks). For example, a connector insertion task is a capability that enables a robot to insert a wire connector into a socket. This task typically includes two actions: 1) move a tool of a robot to a location of the socket, and 2) insert the connector into the socket at the particular location.

In this specification, an action (or subtask) is an operation to be performed by a robot using a tool. For brevity, when a robot has only one tool, an action can be described as an operation to be performed by the robot as a whole. Example actions include welding, glue dispensing, part positioning, and surface sanding, to name just a few examples. Actions are generally associated with a type that indicates the tool required to perform the action, as well as a location within a coordinate system of a workcell at which the action will be performed.

Particular embodiments of the subject matter described in this specification can be implemented so as to realize one or more of the following advantages.

The skill plans for executing multiple skills generated by using the described skill planning techniques are generally more efficient, e.g., faster, use less energy, or both, as well as safer than those that would be generated by existing robot motion planning systems. To that end, after automatically identifying deconflicted skills from an arbitrary number of skills (e.g., third-party skills developed by one or more other organizations) that do not collide or otherwise conflict with each other during execution, the described skill planning techniques can generate the resulting skill plans which plan for executing the deconflicted skills concurrently, i.e., at the same time. Notably, the resulting skill plans are adaptable to the actual local operating conditions (e.g., characterized by sensor inputs or other real-time signals or status messages) at run-time, and whether the skills are planned for execution in concurrency or sequentially may differ from one planning iteration to another is subject to change dependent on the local operating conditions.

Some of the techniques described in this specification allow for a planning software to enforce and make guarantees about the concurrent execution of skills without having the skill developers manually and iteratively check every combination of skills. This saves massive amounts of time and resources in preparing robots to efficiently and safely perform a task. Some of the techniques described in this specification allows for very fast and automatic checks on an automatically planned motion for a robot and determine whether it will interfere with other robots concurrently executing other skills. The utilization of the operating environment may then be improved by having the skills that do not conflict with each other to execute concurrently. Some of the techniques described in this specification allow for ad-lib replanning of the execution of conflicting actions, e.g., by adjusting to sequential execution or replanning by using the new constraints of the other already executing skills, in the cases where the actions are determined to conflict with each other if they were to be executed concurrently.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
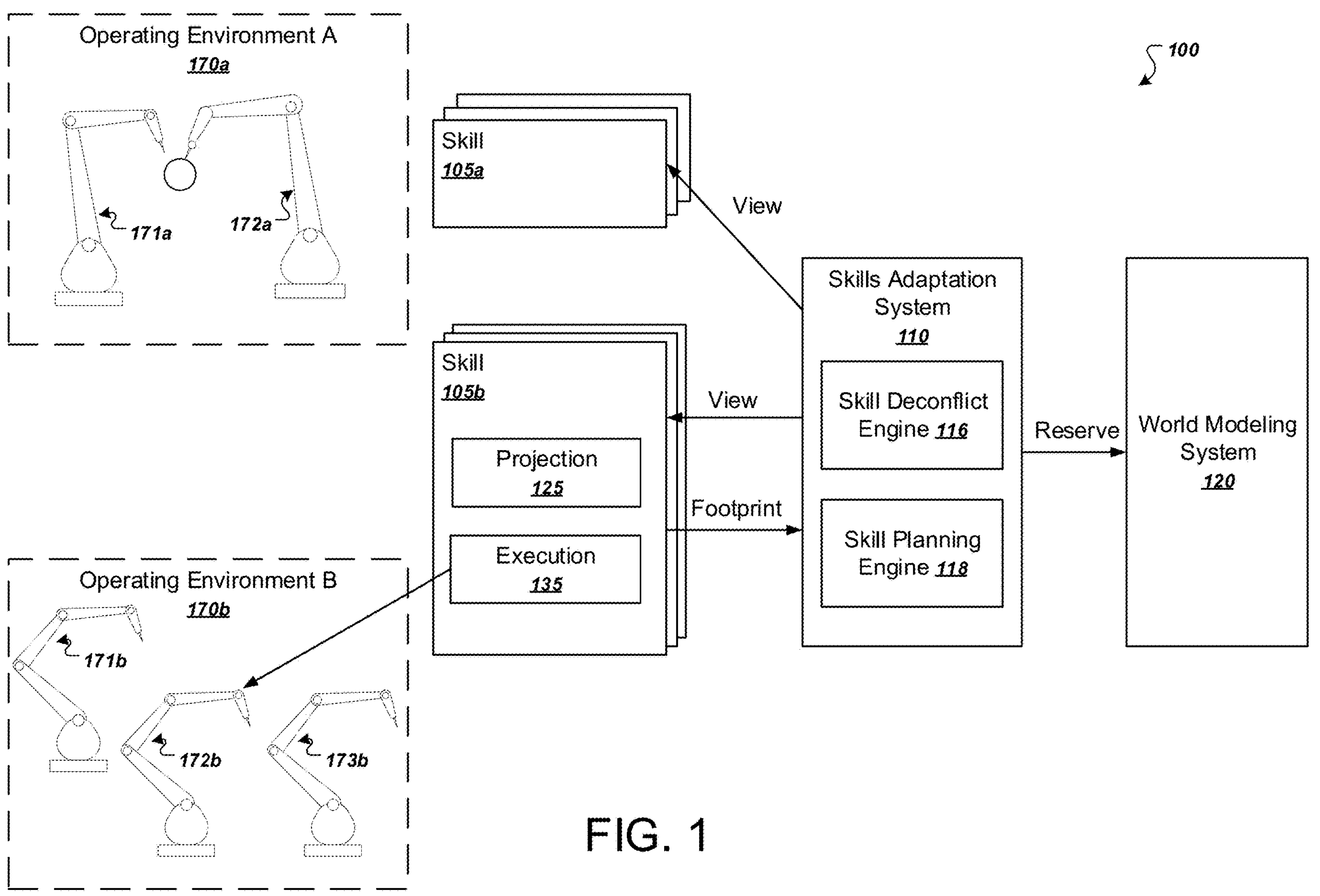
FIG. 1 is a diagram that illustrates an example system.

FIG. 1 is a diagram of an example system 100. The system 100 is an example of a system that can implement the robot motion planning techniques described in this specification.

The system 100 includes a number of functional components, including a skills adaptation system 110 and a world modeling system 120. Each of these components can be implemented as computer programs installed on one or more computers in one or more locations that are coupled to each other through any appropriate communications network, e.g., an intranet or the Internet, or combination of networks. For example, the skills adaptation system 110, the world modeling system 120, or both can be a cloud-based system that communicates with computer systems that are local to one or more operating environments (also referred to as the workcells), e.g., the operating environments 170*a-b*. Each operating environment in turn includes one or more robots. For example, as depicted in FIG. 1, the operating environment 170*a* includes two robots 171*a* and 172*a*, while the operating environment 170*b* includes three robots 171*b*, 172*b*, and 173*b*. Alternatively or in addition, the skills adaptation system 110, the world modeling system 120, or both can include one or more subsystems that are each implemented on a respective computing system that is local to each operating environment.

Moreover, the system 100 can include components additional to those depicted in FIG. 1. For example, the system 100 can include an online execution system that communicates with, e.g., receives status messages from and provides commands to, a robot interface system, which drives the movements of the moveable components, e.g., the joints, of the robots 171*a* or 172*a* in the operating environment 170*a*.

The skills adaptation system 110 can receive multiple skills, e.g., skill 105*a* and 105*b*, e.g., from a skills distribution system or from another source, e.g., a manufacturer or a third-party developer. After receiving each skill, the skills adaptation system 110 can adapt the received skill according to respective local conditions, e.g., the local conditions of the operating environments 170*a-b*. The skills adaptation system 110 can do this by automatically configuring the skill with configuration metadata associated with the skill. For example, the configuration metadata can specify a robot model identifier that represents a particular model of robot that will be executing the skill. As another example, the configuration metadata can also specify a world coordinate system as well the locations of equipment in that coordinate system.

The skills adaptation system 110 can use a skill deconflict engine 116 to perform deconfliction evaluation of the multiple skills, i.e., to evaluate each of the multiple skills and determine whether the skill will conflict with another skill during online execution by the one or more robots. As a result of the deconfliction evaluation, the skills adaptation system 110 can use a skill planning engine 118 which implements planning software to generate an optimized plan for skill execution based on the evaluation results, e.g., to generate a conflict-free skill plan for concurrently executing some or all of the received skills by different robots in the same operating environment. In the cases where the skill plan is generated in the form of a dependency graph, any skills planned for concurrent execution may have no dependency between each other. By contrast, a skill planned for execution subsequent to another skill may be dependent upon the completion of the execution of the other skill.

Using the skill footprints associated with each skill to perform deconfliction evaluation will be described in greater detail below, but in short, the skill deconflict engine 116 uses the skill footprints, which define the resource needs of each skill based on the operating environment provided, as a constraint to evade conflicting one skill with another skill if they were to be executed concurrently.

The skills adaptation system 110 can then provide the received and adapted skills to respective computer systems of the one or more operating environments 170*a-b* for execution of the skills by the one or more robots 171*a*-172*a* and 171*b*-173*b* in accordance with the skill plan to perform a respective task. In some implementations, each of the operating environments are identical to one another. That is, the operating environments may have the same number of robots that are of a common type, and may have the same physical dimensions and the same equipment. In other implementations, there may be different numbers of robots, different types of robots, or both within the operating environments. In addition, the operating environments may have different physical dimensions, different equipment, or both than one another. In the example of FIG. 1, the operating environment 170*a* includes a robot 172*a* with three joints, while the operating environment 170*b* includes a robot 172*b* having four joints. Despite these physical differences, the modularity and reusability of skills allows for the same batch of skills to be adapted automatically to cause each of the robots 171*a* and 172*a* to perform the respective task, even in the implementations where they operate within different operating environments.

Each skill is a collection of data and software that allows a robot to be tuned to perform a particular task. Each skill can define a state machine of subtasks and corresponding transition conditions that dictate under what conditions a robot executing the skill should make a transition from executing one subtask to executing another subtask. Suitable techniques for using skill templates are described in commonly owned U.S. patent application Ser. No. 16/880,869, which is herein incorporated by reference.

As illustrated in FIG. 1, the skill 105*b* has two built-in modules: projection 125 and execution 135. The projection module 125 can receive a definition of parameters for the skill and performs a simulation to generate data representing the result of executing the subtasks of the skill according to those parameters. For example, the input parameters for the projection module 125 may include a candidate motion plan and a definition of dimensions and entities in the operating environment of a robot. The candidate motion plan can be an automatically generated motion plan, e.g., an initial motion plan, or an adjusted motion plan (e.g., a finalized motion plan that is derived from the initial motion plan) that is generated by an online motion planner of the system 100. The candidate motion plan can specify a sequence of joint configurations through which the robot control system should move the robot. On the other hand, the execution module 135 can actually command the robot to do something by using an equipment object. Upon being called by the execution module 135, the equipment object can translate the candidate motion plan into low-level commands that are actually executed by the robot to effectuate the subtasks of the skill.

For each skill, the skills adaptation system 110 can call the projection module 125 of the skill to request and view a simulation with a candidate motion plan, e.g., the initial motion plan. The projection module 125 then uses the candidate motion plan to compute the effects that would occur from actually executing the candidate motion plan on the robot, e.g., time elapsed, swept volume, or any safety issues. The projection module 125 provides the simulation result back to the skills adaptation system 110. The result of the simulation can include a skill footprint representing the resources required to effectuate the candidate motion plan. The skill footprint can be generated in the form of metadata to be associated with skill. The skill footprint can specify the resources requested for performing the skill. The resources can include one or more entities in the operating environment, such as a robot, a tool (or end effector), and, in some cases, a target object. The skill footprint can also specify a volume in the operating environment that is occupied by a corresponding entity, e.g., (a part of) the robot, used to perform the skill. The skill footprint can optionally also specify an elapsed time, a required amount of power, and any safety considerations.

Skills are designed to be highly modular and reusable so that a skill can be developed by one organization and used by another organization without the organizations having a preexisting relationship and without coordinating their activities. For example, developers for a vehicle manufacturer can develop a skill for assembling a vehicle door for a particular model of a vehicle. The skill can then be shipped to manufacturing facilities elsewhere, where the skill will be adapted to execute according to local conditions. The local conditions can include variations in robot models, lighting, workcell dimensions, and workcell conditions, to name just a few examples. But because the skill can be automatically adapted for local conditions, the same skill developed by the vehicle manufacturer can be distributed to all the different facilities, which can all assemble the vehicle door, potentially with different equipment. This approach is vastly superior to attempting to learn a reinforcement control policy from scratch because such learned policies are generally too brittle to be used in a different environment or with different robots.

As another example, a third-party developer can develop skills to be uploaded to the skills distribution system for distribution to other robot installations. For example, a third-party developer can develop a skill for using an in-home consumer robot to assemble a consumer product, e.g., a bookshelf or a desk.

As another example, developers, e.g., developers associated with the skills distribution system, can develop a library of skills for a number of common robotic tasks. For example, developers can generate a skill for performing connector insertion, e.g., for HDMI or USB cables. The skill can then be distributed to robot installations elsewhere to be rapidly adapted for different local conditions, even when the other installations use different types of connectors or different robots.

A skill has an associated skill footprint, or for brevity, a footprint, that includes information about the resource needs of the skill based on the operating environment provided. For example, for the skill 105*a* or 105*b*, the skill footprint defines which target objects need to be manipulated, which robot and/or tool will be used, and the like. As another example, the skill footprint defines what entities in the operating environment should be observed by sensors (e.g., any obstacles that are within a threshold distance of the target objects). As yet another example, the skill footprint can specify other metadata, including swept volumes for performing the associated subtasks. In this specification, a motion swept volume is a region of the space that is occupied by at least a portion of a robot or tool during the entire execution of a subtask.

The world modeling system 120 implements a collection of data and software that can be used to model the operating environments 170*a-b*. For each operating environment, the world modeling system 120 can maintain a corresponding world template, or for brevity, a world, that defines or otherwise specifies a latest world state of the operating environment, including the latest world states of the entities included therein. For example, for each operating environment, the world modeling system 120 can maintain a world template that includes information describing the current pose (i.e., position, orientation, or both) of the robot, the current pose of the target object, and respective current poses of the obstacles included in the operating environment. For example, the target object may be a workpiece to be manipulated by the robot, while the obstacles may include walls, hardware equipment, or other robots.

The skills adaptation system 110 interact with world modeling system 120 to obtain, e.g., through a read request, the world states of entities in the operating environment and to modify, e.g., through a write request, the world states of entities in the environment accordingly in the cases where the states of entities in the operating environment have changed as a result of skill execution. For example, the skills adaptation system 110 can update the previous pose of the target object that is maintained at the world modeling system 120 as a result of manipulating the target object by the robot.

TABLE 1 includes an example of code deployed in the system 100 to facilitate skill execution.

TABLE 1

```
void Run( ) {
  World world = GetStartingWorld( ) ;
  for (auto skill_data : sequence) {
    skill_data = skill_data.instance.Project (world,
skill_data.opt_project_blob) ;
    skill_data.instance.Execute(world,
skill_data.opt_project_blob) ;
  }
}
```

On line 4, the projection function of the skill is called, with information including an optional pre-computed path for the skill (in a BLOB data format) passed to the projection function as parameters. The projection function "projects" the skill into the operating environment by performing a simulation to generate data representing the pre-computed path for the skill as well as the result of executing the subtasks of the skill according to those parameters.

On line 6, the execution function of the skill is called, with information including the pre-computed path for the skill passed to the execution function as parameters. The execution function actually commands the one or more robots to execute the skill in the operating environment. The parameters passed to the projection and execution functions may also include reference IDs for various entities, such that the functions can request the information about the world states of the entities by providing the reference IDs to the world modeling system 120.

For each skill, the world modeling system 120 is configured to provide information to the skills adaptation system 110 relating only to entities defined in the associated footprint of the skill. By doing so, the world modeling system 120 imposes a guarantee that the skill, once kicked off for execution, is only allowed to manipulate target objects defined in the associated footprint. This allows for a safer execution environment and also allows for very fast and automatic checks on automatically generated motion plans and whether they will interfere with other robots concurrently executing other skills.

In more detail, for each skill, the world modeling system 120 maintains a segmentation subset of the skill footprint that identifies one or more entities in the operating environment for performing the skill and that specifies requested permissions for the one or more entities. The requested permissions can include a permission of the skill to read, write, or otherwise manipulate the world states of the one or more entities. The one or more entities may be automatically added to the segmentation subset of the skill footprint by the world modeling system 120 prior to the execution of the skill. And then while the skill is executing, the world modeling system 120 is configured to deny any read or write request received from the skills adaptation system 110 that references an entity that does not occur in the segmentation subset of the skill footprint. In other words, by adding one or more entities to the segmentation subset of the skill footprint, the permission to access the world states of the one or more entities by the skills adaptation system 110 is reserved. Correspondingly, a skill will not be allowed to make use of or modify any entity that is not defined in the associated skill footprint. In some implementations, this reserved permission can be exclusive, i.e., the one or more entities can be added to one and only one segmentation subset, and the access permission to the world states of the one or more entities can only be reserved for one particular skill at any given time point during execution.

Using the techniques described in this specification can greatly aid users in a variety of complex robot planning tasks. As one illustrative example, an engineer at a manufacturing facility might be tasked with setting up a large workcell having three robots that each operate on one or more workpieces that are moved along by a conveyor belt. For example, a first robot can sand a surface of a first workpiece, a second robot can drill a hole on a second workpiece, and a third robot can attach another part to the drilled hole to the second workpiece. Traditional robotic programming techniques would require weeks of manual programming of the robots on site in order to get the workcell up and running. Additional manual programming would be further needed if the robots were to be programmed to execute in an efficient and yet conflict-free manner.

But the process is much easier when using skills having as described above. First, the user can position the robots in the workcell and then obtain three skills for each of the three tasks, with each skill being assigned to one of the three robots. The user can then specify a model or other identifier of the robots that are being used. The robots need not even be the same model or same manufacturer. The planning software described above can then automatically generate optimized skill plans that work with each respective robot for efficiently and safely executing these skills. For example, the planning software can generate a skill plan in which the first and second robots execute their respective skills concurrently, followed by the third robot executing its skill until after the execution of the skill by the second robot is completed. Thus, the vast majority of planning process happens automatically and in a way that enables rapid workcell deployments.

Figure 2:
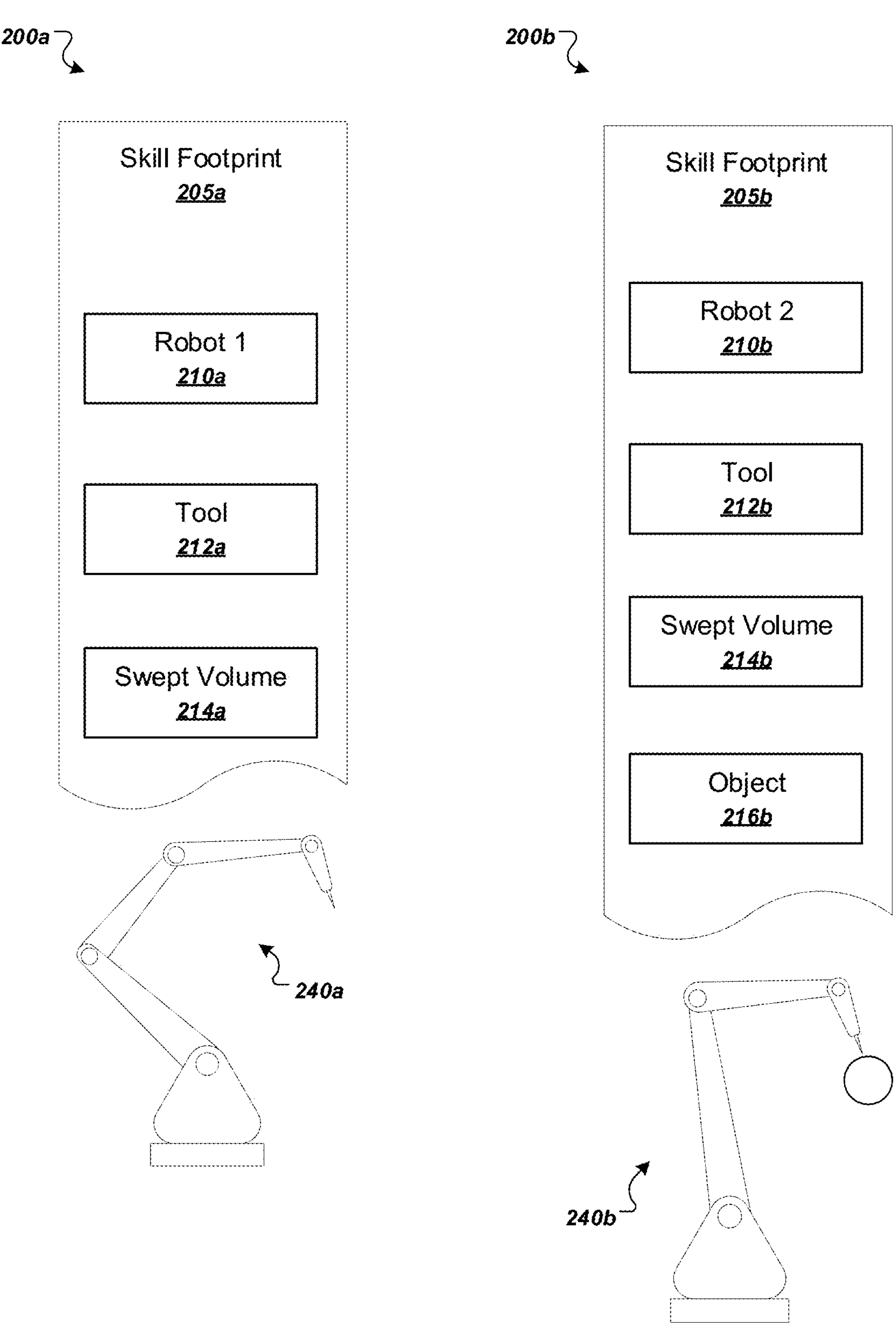
FIG. 2 shows example illustrations of a skill footprint.

FIG. 2 shows example illustrations of a skill footprint. As shown on the left hand side of FIG. 2, an example skill footprint 205*a* for a first skill includes information about the resource needs 210*a*-214*a* of the first skill. In some cases, the skill footprint 205*a* is generated by a projection function implemented by the first skill. In other cases, the skill footprint 205*a* is a precomputed footprint received from the same source that also provided by the first skill, and may be updated as a result of the invocation of the projection function. In either case, the skill footprint can be maintained in the form of metadata to be associated with the first skill.

Specifically, the example skill footprint 205*a* specifies a robot 210*a* in the operating environment that should be used to execute the skill. For example, the example skill footprint 205*a* can specify a robot model identifier that represents a particular model of robot that will be executing the skill. The example skill footprint 205*a* also specifies a tool 212*a* that should be used by the robot to execute the skill, e.g., by similarly specifying a tool identifier. The example skill footprint 205*a* further specifies a volume 214*a* in the operating environment that is required for performing the skill. For example, the volume can be an estimated swept volume caused by rotational, translational, and prismatic joint motions of the identified robot.

As shown on the right hand side of FIG. 2, an example skill footprint 205*b* for a second skill includes information about the resource needs 210*b*-216*b* of the second skill. Unlike the example skill footprint 205*a* on the left hand side, in addition to specifying resources including the robot 210*b*, the tool 212*b*, and the swept volume 214*b*, the example skill footprint 205*b* also specifies a target object 216*b* that will be manipulated by the robot. As will be described further below, this gives the skill adaptation system 110 the (exclusive) permission to access the world states of the target object from the world modeling system 120 once the second skill is kicked off for execution. For example, the world states of the target object may be computed or otherwise derived from the sensor observations of the target object.

Figure 3:
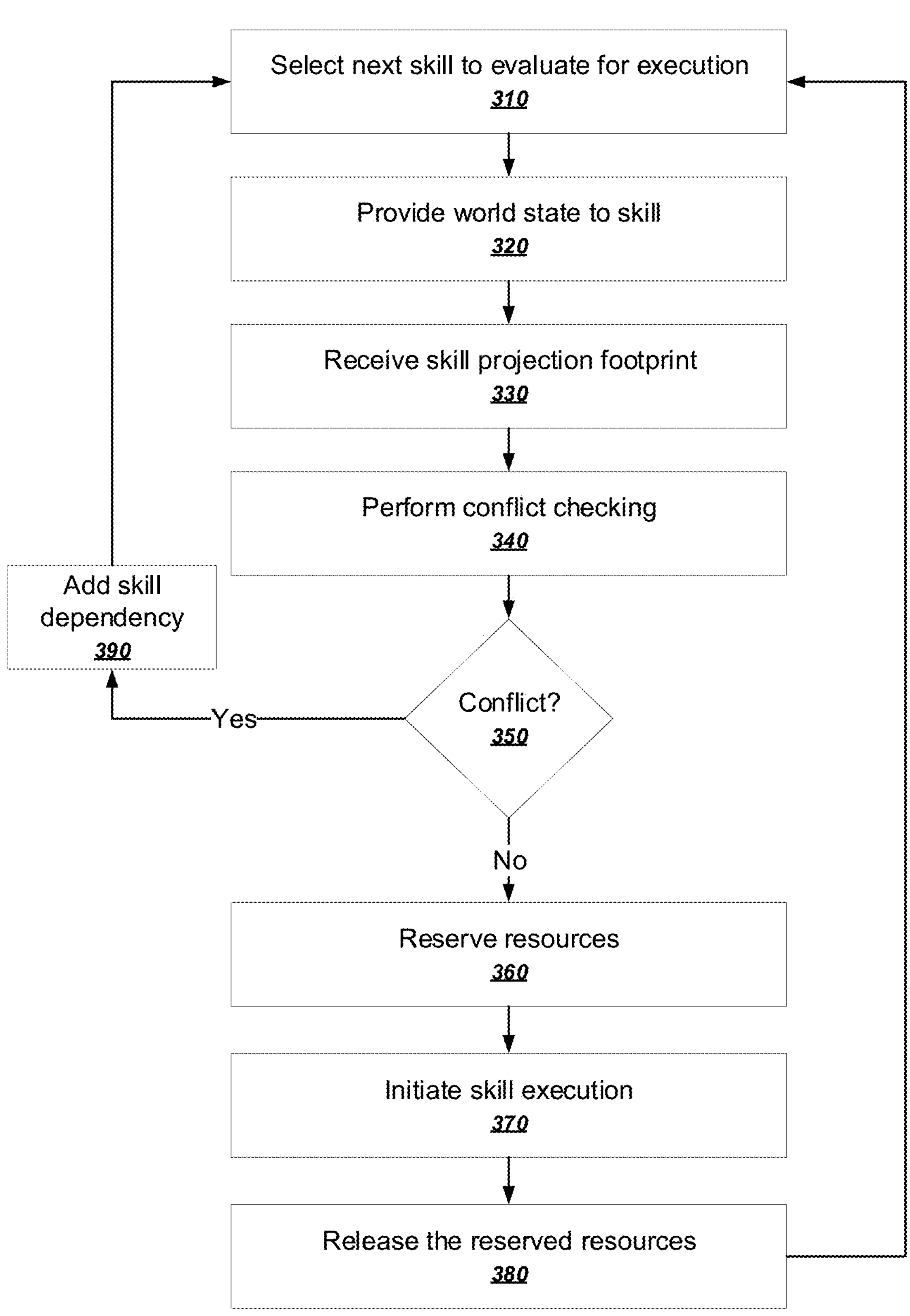
FIG. 3 is a flowchart of an example process for initiating skill execution.

FIG. 3 is a flowchart of an example process for initiating skill execution. The process can be executed by a system of one or more computers appropriately programmed in accordance with this specification, e.g., the system 100 of FIG. 1. For convenience, the process will be described as being performed by a system of one or more computers.

As described above, the system can receive data defining multiple skills to be performed by one or more robots in an operating environment. In some examples, the system can receive the multiple skills from different organizations, e.g., from different developers.

The system advances to the selects a next skill to evaluate for execution (310). For example, the system can repeatedly iterate through the following steps of evaluation for every received skill to determine in what order the multiple skills may be executed.

The system provides the world states of entities to the skills adaptation system 110 that runs the skill (320). The entities may be the resources in the operating environment that are specified in the associated, precomputed skill footprint of the skill. For example, the resources can include a robot, a tool, and, in some cases, a target object, that are required for performing the skill, as predefined by the skill developer. The world states of these entities are maintained by the world modeling system 120 of FIG. 1.

The system invokes a projection function implemented by the skill, and receives a skill projection footprint (330). Upon called, the projection function generates an updated skill footprint representing the resources that are required for performing the skill and a volume occupied by a corresponding entity used to perform the skill. In some examples, the skill footprint can define a volume in the operating environment that is required for performing the skill, a tool that is required for performing the skill, a robot that is required for performing the skill, a target object that is required for performing the skill, or a combination thereof and possibly more. In these examples, the volume, the tool, and the robot defined in the updated skill footprint may be the same or different from those defined in the precomputed skill footprint.

The system uses the skill footprint to perform conflict checking of the skill with respect to any other skill defined in the received data (340).

The system determines whether there is a conflict (350). Specifically, the system determines whether the skill footprint requires a same volume, tool, or robot with respect to any other skill footprint; and in response to determining that the skill footprint does not require the same volume, tool, or robot with respect to any other skill footprint, the system determines that there is no conflict between the skill with respect to any other skill. In some cases, the system can then classify the skill as a deconflicted skill.

If there is no conflict between the skill footprint with respect to any other skill footprint, the system advances to the next step to reserve the access permission of the world states of these resources by the skill in the world modeling system (360). In particular, the system generates a segmentation subset of the skill footprint that identifies one or more entities in the operating environment required for performing the skill and that specifies requested permissions for the one or more entities. For example, the requested permissions can include a permission of the skill to read, write, or otherwise manipulate the world state of the robot, the world state of the tool, or the world state of the target object.

The system initiates execution of the skill by calling the execution function of the skill (370) and, after the execution of the skill has completed, releases the resources reserved for the skill in the world modeling system (380).

TABLE 2 includes an example of code deployed in the system 100 to reserve resources fora skill.

TABLE 2

```
void Run( ) {
  World world = GetStartingWorld( ) ;
  while (HasMoreSkills( ) ) {
    auto& skill_data = GetNextSkill( ) ; // Blocking
for a new skill to become available (satisfied
prerequisites)
    { // Lock the subset of world during project
    auto world_lock_guard = world.LockSubset
(skill_data.footprint); // Get exclusive access here
    skill_data = skill_data.instance.Project (world,
skill_data.opt_project_blob) ;
    world.AddVolume
(skill_data.footprint.swept_volume) ;
    }
    skill_data.instance.ExecuteAsync (world,
skill_data.opt_project_blob, [ ] ( ) {
    auto world_lock_guard = world.LockSubset
(skill_data.footprint.swept_volume); // Get exclusive
access here
    world.RemoveVolume
(skill_data.footprint.swept_volume) ;
    } )
  }
}
```

On line 4, a next skill is selected to evaluate for execution. The skill is associated with footprint data.

On line 8, a segmentation subset of the skill footprint that identifies one or more entities in the operating environment for performing the skill is generated. The segmentation subset specifies requested permissions for the one or more entities in the operating environment. In this way, an exclusive access to the world states of the one or more entities by the skill during execution is reserved.

On line 10, the projection function of the skill is called, with information including the pre-computed path for the skill and reference IDs of entities passed to the projection function as parameters. The projection function returns the updated skill footprint.

On line 12, because the updated skill footprint returned by the projection function also specifies a volume occupied by a corresponding entity used to perform the skill, the volume is added to the segmentation subset of the skill footprint. This corresponds to the resource reservation step 360 where the system reserves the access permission of the world state of this volume by the skill in the world modeling system.

On line 17, an exclusive access (e.g., exclusive write access) to this volume in the operating environment is reserved for the skill during execution. Line 17 can be executed upon completion of the execution of skill.

On line 20, the volume in the operating environment is removed from the segmentation subset of the skill footprint once the execution of the skill has completed. Line 20, when executed, effectively releases the occupation of the volume in the world modeling system. Lines 17-21 correspond to the resource release step 380.

Alternatively, in response to determining that the skill footprint does require the same volume, robot, or tool with respect to another skill footprint, the system determines that there is conflict between the skill with respect to the other skill. In some cases, the system can then classify the skill as a conflicting skill.

If there is conflict between the skill with respect to any other skill, the system adds a skill dependency (branch to 390). For example, the system can generate a skill plan that stacks the skills in a sequential order, in which the skill is kicked off for execution only after the execution of the other skill has completed.

TABLE 3 includes an example of code deployed in the system 100 to add dependency for a skill.

TABLE 3

```
void Run( ) {
  World world = GetStartingWorld( ) ;
  while (HasMoreSkills( ) ) {
    auto& skill data = GetNextSkill( ) ; // Blocking
for a new skill to become available (satisfied
prerequisites)
    { // Lock the subset of world during project
    auto world_lock_guard = world.LockSubset
(skill_data.footprint) ; // Get exclusive access here
    auto status_or_skill_data =
skill_data.instance.Project (world,
skill_data.opt_project_blob) ;
    if (!status_or_skill_data.ok( ) ) {
    addDependency (skill_data,
status_or_skill_data.error( ) ) ;
    continue;
    }
    skill_data = status_or_skill_data.value( ) ;
    world.AddVolume
(skill_data.footprint.swept_volume) ;
    }
    skill_data.instance.ExecuteAsync (world,
skill_data.opt_project_blob, [ ] ( ) {
    auto world_lock_guard = world.LockSubset
(skill_data.footprint.swept_volume) ; // Get exclusive
access here
    world.RemoveVolume
(skill_data.footprint.swept_volume) ;
    } )
  }
}
```

On line 10, after calling the projection function of the skill, the skill footprint returned by the projection function is used for conflict check of the skill with respect to other skills.

On lines 13-17, because there has been determined from the skill footprint to have a conflict between the skill and one or more other skills, a skill dependency is added (line 14).

On line 18, the skill footprint is saved into skills adaptation system 110 for use with the next steps of the flow chart.

On lines 24-28, after skill execution, the occupation of the volume in the world modeling system is released.

From either branch, the system can re-perform the process (return to 310) to evaluate another skill.

Figure 4:
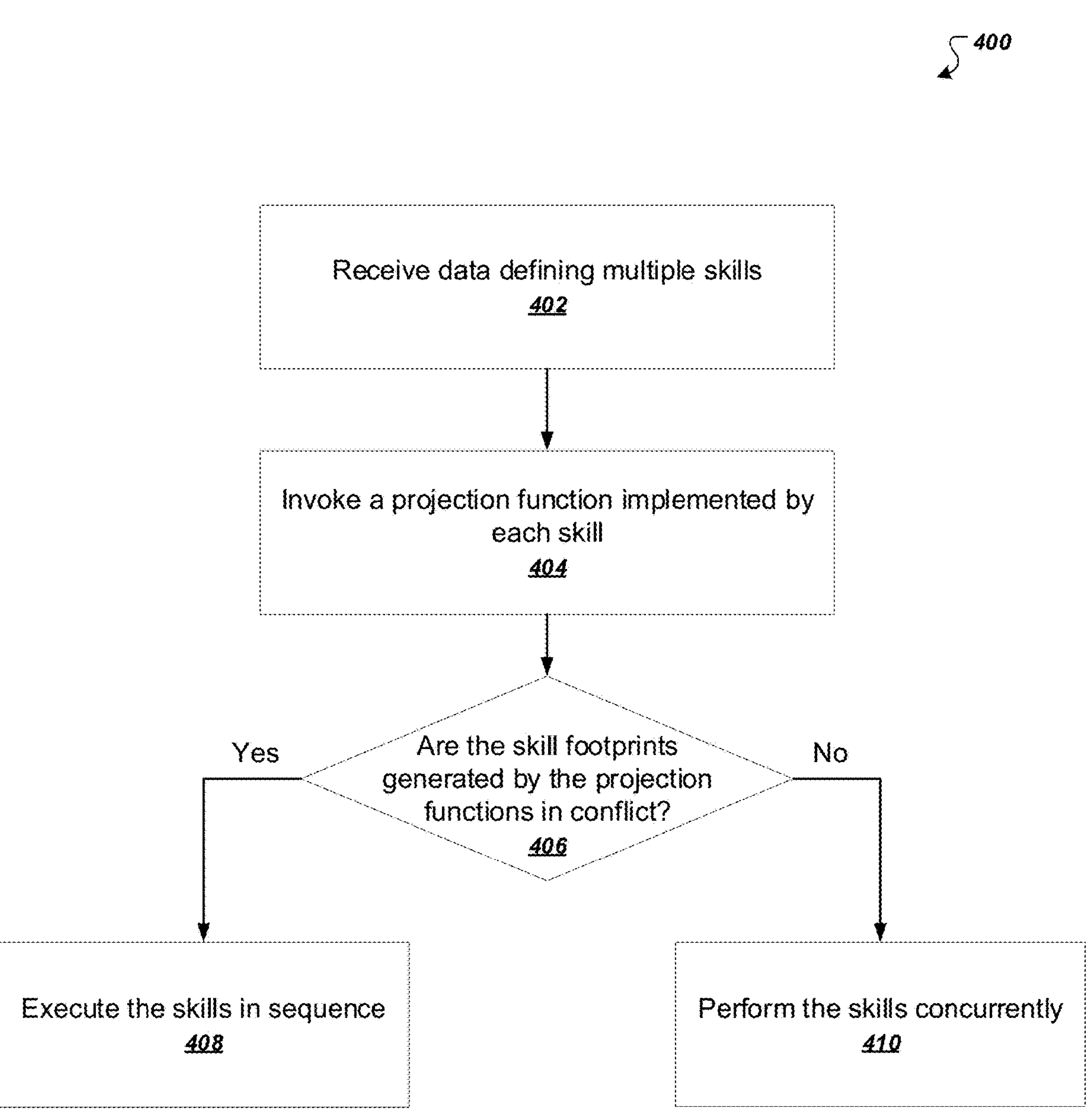
FIG. 4 is a flowchart of an example process for using skill footprints to determine whether multiple skills can be executed in sequence.

FIG. 4 is a flowchart of an example process 400 for using skill footprints to determine whether multiple skills can be executed in sequence. The process 400 can be performed by a system of one or more computers in one or more locations and programmed in accordance with this specification. For example, the process 400 can be performed by the system 100 shown in FIG. 1. For convenience, the process 400 will be described as being performed by a system of one or more computers.

The system receives data defining multiple skills to be performed by one or more robots in an operating environment (402). The system may receive the skills from a variety of different sources, e.g., equipment manufacturers, product manufacturers, and third-party developers. In various cases, the multiple skills defined in the received data may include a first group of skills that can be executed concurrently. Each skill in the first group of skills can be executed in concurrency with one or more other skills in the first group of skills to improve task execution efficiency, e.g., increase utilization of available resources in the operation environment. The multiple skills defined in the received data may also include a second group of skills that cannot be executed concurrently. A skill in the second group of skills cannot be executed in concurrency with another skill because of potential risks of conflict with the other skill, its dependency on the execution result of the other skill, or both.

The system invokes a projection function implemented by each skill (404). As described above, the projection function is a skill functionality that simulates execution of a candidate motion plan in the operating environment and records the results of the simulation. The simulation results include a skill footprint specifying a set of resources requested for performing the skill. In some examples, the set of resources can include one or more tools that are required for performing the skill, one or more robots that are required for performing the skill, one or more target objects required for performing the skill, or a combination thereof and possibly more. The skill footprint can also specify a spatial volume in the operating environment occupied by a corresponding entity, e.g., the robot, used to perform the skill.

The system determines whether the corresponding skill footprints generated by the projection functions for the multiple skills are in conflict (406). In particular, for each of the multiple skills, the system determines whether the skill footprints generated by the projection functions are in conflict by determining whether the skill requires a same resource (e.g., a same tool, or a same robot), occupies a same volume, or both with respect to any other skill in the multiple skills.

In some cases, in response to determining that the skill footprint requires the same tool or robot, occupies the same volume, or both with respect to any other skill footprint, the system can classify the skill as a conflicting skill. A conflicting skill should not be executed in concurrency with any other skill in the operating environment due to potential risks of conflict.

In these cases, the system executes the conflicting skills in sequence (408).

Figure 5A:
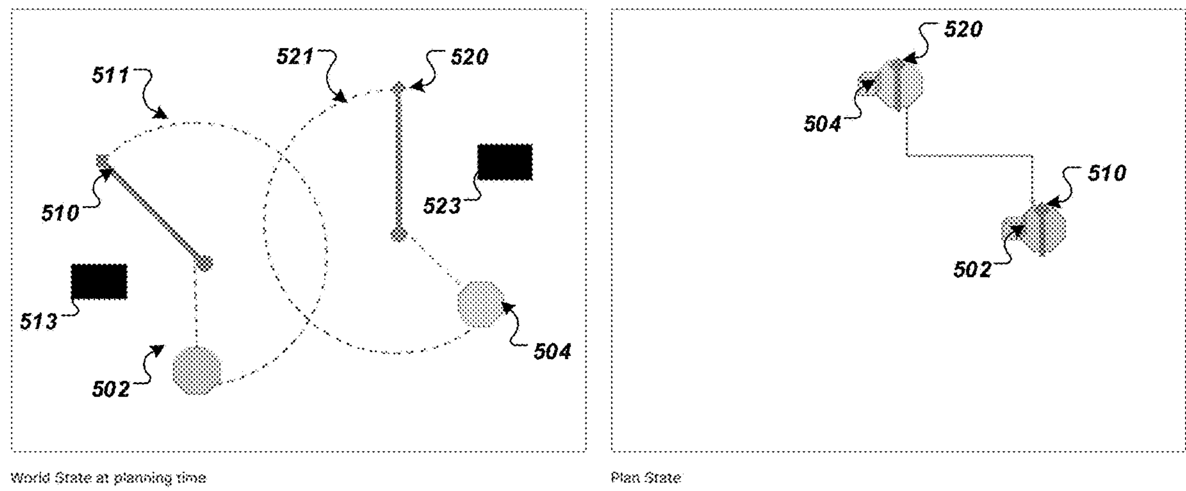
FIGS. 5A-C show example illustrations of sequentially executing multiple skills.
Figure 5B:
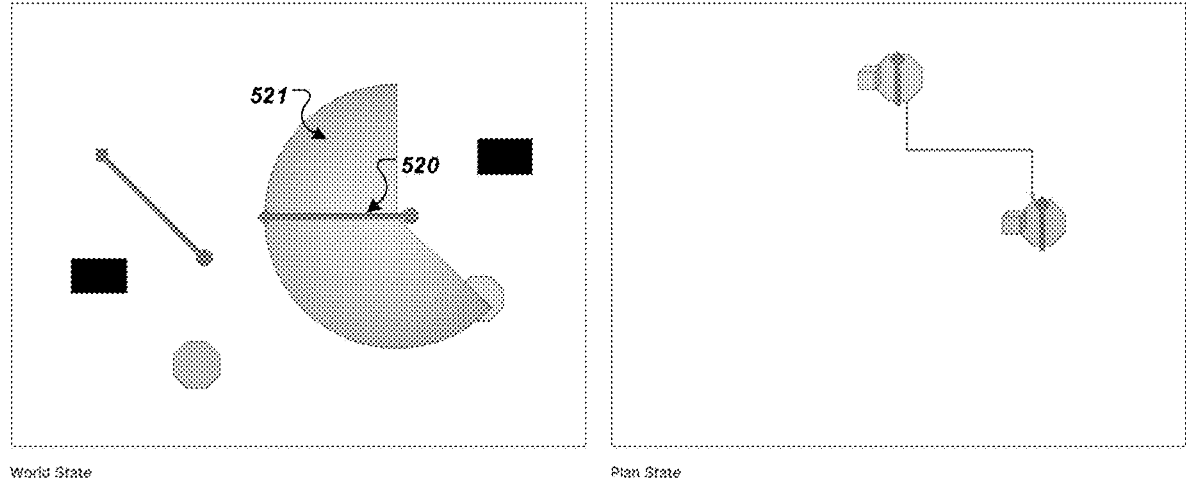
Figure 5C:
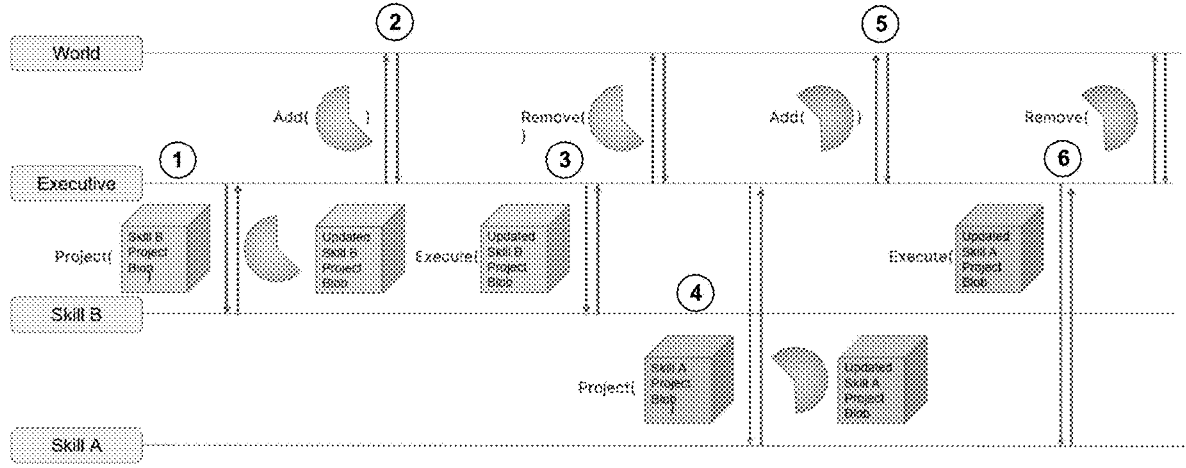

FIGS. 5A-C show example illustrations of sequentially executing multiple skills. In the example of FIG. 5, data that defines target pose 502 (illustrated as an octagon) and target pose 504 has been received by the system, and the operating environment includes a first robot 510, a second robot 520, and two obstacles 513 and 523. Each robot is a robot having a link (illustrated as a line) between a base (illustrated as a circle) and an end effector (illustrated as a rhombus). The target pose can be a pose (e.g., a position, an orientation, or both of the robot end effector) associated with a corresponding skill that a robot should have in order to execute the corresponding skill.

In short, as shown in FIG. 5A, because there exists a conflict, i.e., an overlap, between the volumes 511 and 521 in the operating environment occupied by the two robots 510 and 520 when moving to target pose 502 and target pose 504, respectively, the skills will have to be executed sequentially, where skill A associated with target pose 502 is executed by using the first robot 510 after skill B associated with target pose 504 has been executed by using the second robot 520.

In the example swim lane diagram shown in FIG. 5C, at step 1, during the planning stage, the skills adaptation system ("Executive") calls the projection function implemented in skill B associated with target pose 504 to request a simulation and to generate the updated skill footprint for the second skill, which includes information that specifies a volume 521 in the operating environment occupied by the second robot 520 used to perform skill B. For example, because the obstacle 523 is known to be present in the operating environment, the projection function generates the volume 521 swept through by a path that avoids the expected location of the obstacle 523.

Accordingly, at step 2, the world modeling system ("World") reserves the volume 521 in the operating environment for skill B by generating a segmentation subset of the skill footprint associated with skill B that identifies the volume 521 for performing skill B and that specifies requested permissions for the volume 521. At step 3, the skills adaptation system requests that skill B to be executed on the second robot 520 by calling the execution function and, once the execution has completed, removes the reserved volume 521 from the segmentation subset, thereby releasing this resource in the operating environment so that it may be utilized by another skill. Once execution of skill B has completed, steps 4-6 can then be similarly performed to plan and subsequently execute skill A associated with target pose 502 by using the first robot 510.

In some implementations, the system can generate a skill plan in the form of a dependency graph defining the multiple skills and one or more respective dependencies between one or more of the multiple skills. As shown on the right hand side of FIG. 5A, a dependency graph is a graph having vertices that represent the multiple skills, and directed edges that represent the relationship existing between the vertices. In particular, the skill plan specifies sequential, rather than concurrent, execution of any skills that are not deconflicted skills. To execute the conflicting skills in the multiple skills in a sequential manner, the system can then cause the one or more robots to follow the skill plan, including causing the one or more robots to execute the skills in accordance with the skill dependencies defined by the skill plan.

While FIG. 5 shows that the operating environment includes only two robots, in general, an operating environment may include a larger number of robots, e.g., six robots, twelve robots, or more. In addition, the received data may define a larger number of skills, e.g., twenty skills, fifty skills, or more. Despite the large numbers, the scalable nature of the planning techniques described in the specification can effectively and automatically generate a conflict-free skill plan for efficient execution of these skills by different robots.

Alternatively, in other cases, in response to determining that the skill footprint does not require the same tool or tool and does not occupy the same volume with respect to any other skill footprint, the system can classify the skill as a deconflicted skill. A deconflicted skill can generally be executed in concurrency with another deconflicted skill.

In these other cases, the system executes the deconflicted skills concurrently (410).

Figure 6A:
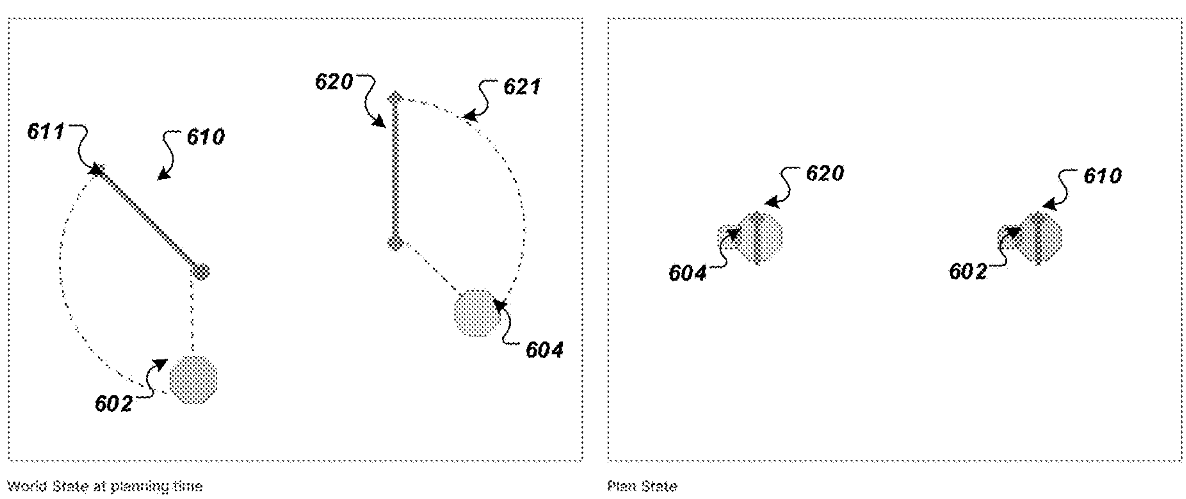
FIGS. 6A-C show example illustrations of concurrently executing multiple skills.
Figure 6B:
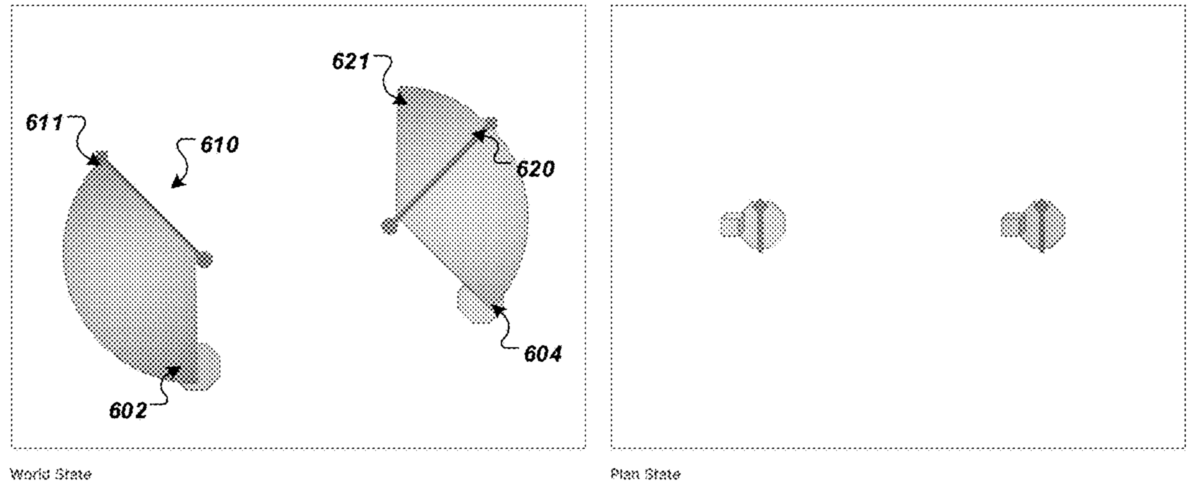
Figure 6C:
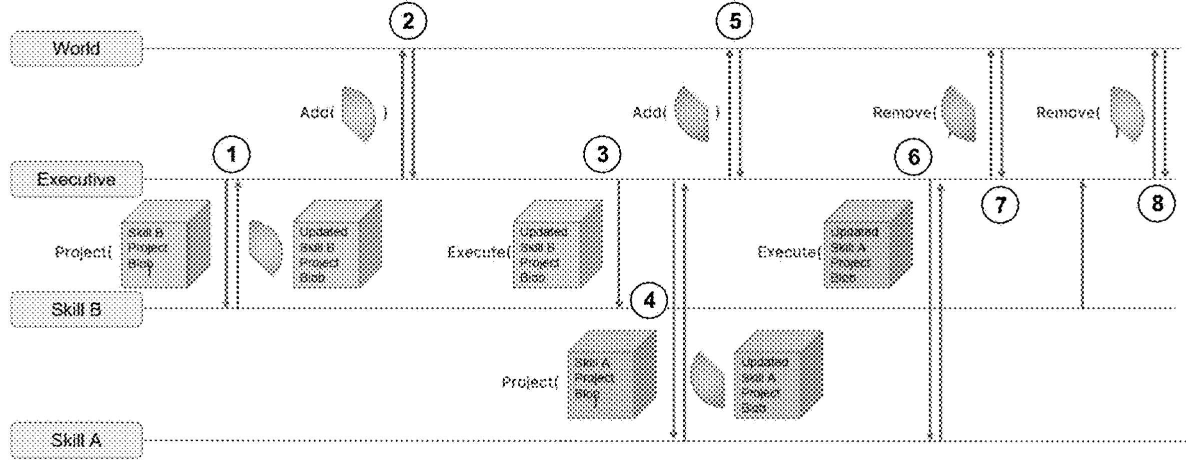

FIGS. 6A-C show example illustrations of concurrently executing multiple skills. In the example of FIG. 6, data that defines target pose 602 and target pose 604 has been received by the system, and the operating environment includes a first robot 610, and a second robot 620.

In short, as shown in FIG. 6A, because there exists no overlap between the volumes 611 and 621 in the operating environment occupied by the two robots 610 and 620 when moving to target pose 602 and target pose 604, respectively, the skills are executed concurrently, i.e., skill A associated with the target pose 602 is being executed by the first robot 610 at a same time when skill B associated with target pose 604 is being executed by the second robot 620.

In the example swim lane diagram shown in FIG. 6C, at step 1, during the planning stage, the skills adaptation system ("Executive") calls the projection function implemented in skill B associated with target pose 604 to request a simulation and to generate the updated skill footprint for skill B, which includes information that specifies a volume 621 in the operating environment occupied by the second robot 620 used to perform skill B. Accordingly, at step 2, the world modeling system ("World") reserves the volume 621 in the operating environment for skill B by generating a segmentation subset of the skill footprint associated with skill B that identifies the volume 621 for performing skill B and that specifies requested permissions for the volume 621. At step 3, the skills adaptation system requests that skill B to be executed on the second robot 620 by calling the execution function.

Unlike the example of FIG. 5, however, while skill B is being executed by the second robot 620, at step 4, the skills adaptation system ("Executive") calls the projection function implemented in skill A associated with target pose 602 to request a simulation and to generate the updated skill footprint for skill A, which includes information that specifies a volume 611 in the operating environment occupied by the first robot 610 used to perform skill A. Accordingly, at step 5, the world modeling system ("World") reserves the volume 611 in the operating environment for skill A by generating a segmentation subset of the skill footprint associated with skill A that identifies the volume 611 for performing skill A and that specifies requested permissions for the volume 611. At step 6, while skill B is still being executed by using the second robot 620, the skills adaptation system requests that skill A to be executed on the first robot 610 by calling the execution function.

At steps 7 and 8, after the respective execution of skill A and skill B has completed, the world modeling system removes the reserved volumes 611 and 621 from the respective segmentation subsets, thereby releasing these resources in the operating environment so that they may be utilized by another skill.

Figure 7:
FIG. 7 is a flowchart of an example process for executing skills using segmentation subsets of skill footprints.
Figure 7:
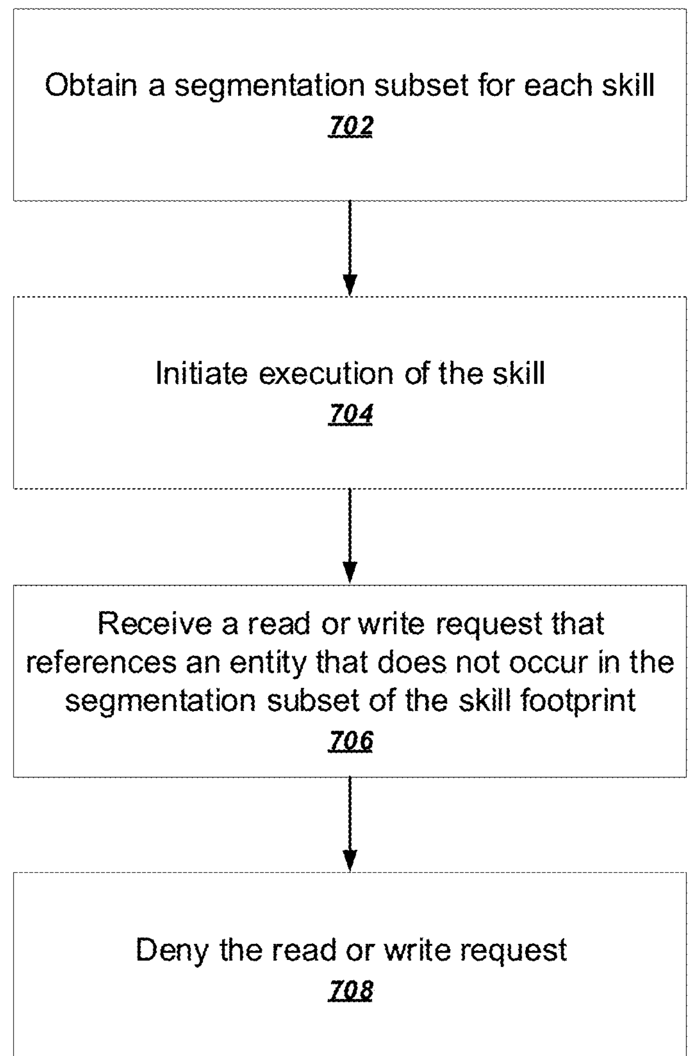

FIG. 7 is a flowchart of an example process 700 for executing skills using segmentation subsets of skill footprints. The process 700 can be performed by a system of one or more computers in one or more locations and programmed in accordance with this specification. For example, the process 700 can be performed by the system 110 shown in FIG. 1. For convenience, the process 700 will be described as being performed by a system of one or more computers.

The system obtains, i.e., receives or generates, for each of the multiple skills to be performed by one or more robots in a workcell, a skill footprint and a segmentation subset of the skill footprint (702). The skill footprint for each skill can specify the set of resources requested for performing the skill. The resources can include one or more entities in the operating environment, such as a robot, a tool, and, in some cases, a target object. The skill footprint can also specify a volume occupied by a corresponding entity, e.g., the robot, used to perform the skill. The skill footprint can optionally also specify an elapsed time, a required amount of power, and any safety considerations.

For each skill, the segmentation subset of the skill footprint identifies the one or more entities in the operating environment, as specified by the skill footprint as resources required for performing the skill, and specifies requested permissions for the one or more entities. For example, the requested permissions may include the permission of the skill to read, write, or otherwise manipulate the latest world state of an entity, which can be a tool or a robot or another resource in the operation environment.

In some implementations, one or more locks can be applied to the one or more entities identified in the segmentation subset of the skill footprint. For example, the one or more locks can include a read lock or a write lock, which can be either exclusive or non-exclusive, i.e., shared. In general, during execution, a read (or write) lock applied to a particular entity blocks any skill that does not have the requested read (or write) permission from reading (or modifying) the latest world state of the particular entity.

The segmentation subset may also identify the target object of the skill, entities to be moved when performing the skill, entities to be observed by sensors when performing the skill, or a combination thereof, and correspondingly specify requested permissions (e.g., read or write permissions) for the target object and/or entities.

The segmentation subset may further identify one or more spatial volumes in the operating environment required for performing the skill. Correspondingly, the segmentation subset may specify requested permissions for the one or more spatial volumes in the operating environment. For example, the requested permissions may include the permission of the skill to enter the spatial volume.

In some implementations, prior to execution of each skill and, e.g., as a result of the invocation of the projection function implemented by the skill, the system can automatically add one or more additional entities to the segmentation subset of the skill footprint. In some of these implementations, the system can add one or more additional entities that are parent entities or child entities of an entity in the segmentation subset in a tree of entities in the operating environment. When added as the additional entities, the system can add read locks for the parent entities, and can add write locks for the child entities. In some of these implementations, the system can add one or more other entities that are within a threshold distance of a footprint volume of the skill footprint. In this way the system creates a safety buffer within the operating environment that encloses the volume that the robot may occupy when executing the skill.

The system initiates execution of a first skill (704) by calling the execution function implemented by the first skill. The first skill may be any skill obtained by the system at step 702.

While the first skill is executing, the system may receive a read or write request that references an entity that does not occur in the segmentation subset of the skill footprint (706). For example, in various cases, the execution function implemented by the first skill may attempt to obtain and/or modify the latest world state of a particular entity that does not occur in the segmentation subset of the skill footprint associated with the first skill.

While the first skill is executing, the system may also receive a request to enter a volume in the operating environment that does not occur in the segmentation subset of the skill footprint. For example, the execution function implemented by the first skill may attempt to cross a boundary of the volume in the segmentation subset of the skill footprint.

In response, the system denies the read or write request that references the entity that does not occur in the segmentation subset of the skill footprint (708). The system also denies the request to cross the boundary of the volume in the segmentation subset of the skill footprint associated with the first skill.

In this way, for a given skill, any resources that are not specified in the associated skill footprint during the planning phase will not be accessible to the skill during execution phase. This serves as an added guarantee of correctness for skill developers by ensuring consistency between the planning phase and the execution phase of the skill.

Figure 8A:
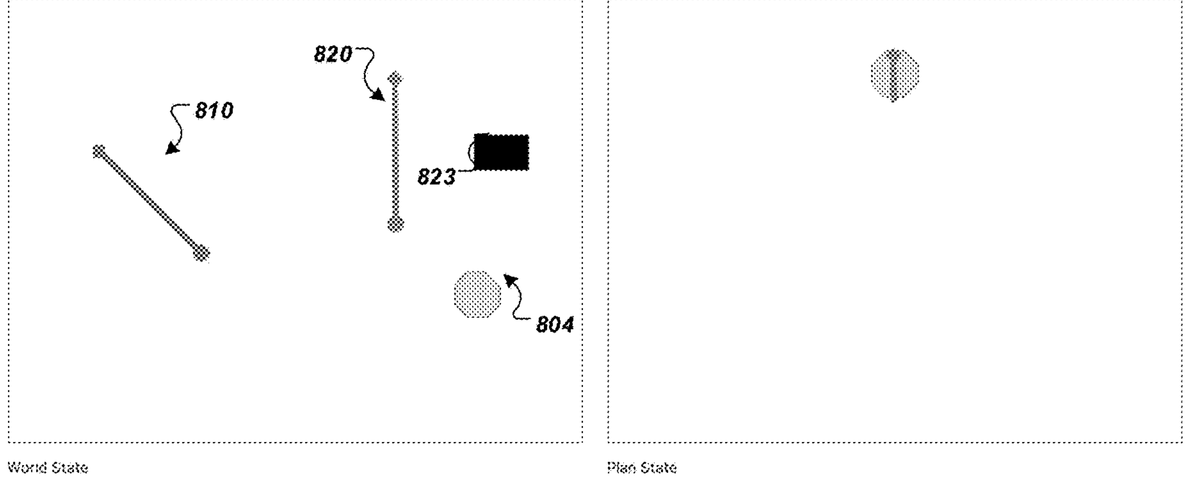
FIGS. 8A-C show example illustrations of executing skills using a segmentation subset of a skill footprint.
Figure 8B:
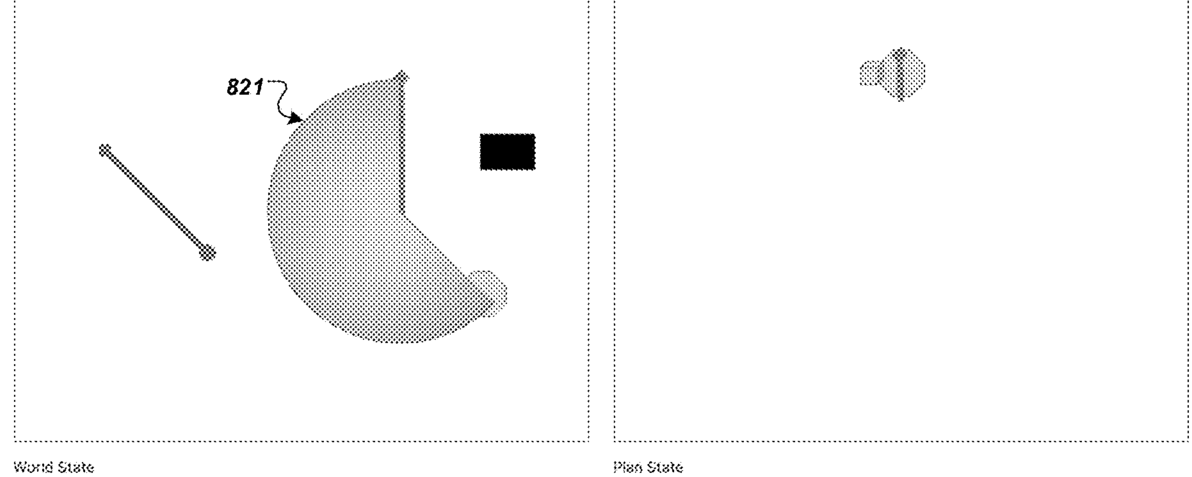
Figure 8C:
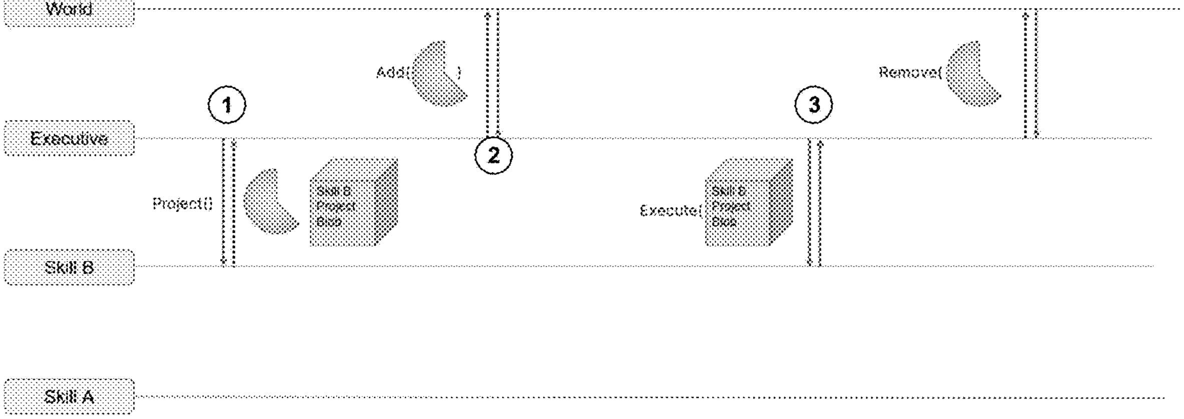

FIGS. 8A-C show example illustrations of executing skills using a segmentation subset of a skill footprint. In the example of FIG. 8, data that defines target pose 804 has been received by the system, and the operating environment includes a first robot 810, a second robot 820, and an obstacle 823. Skill B that is associated with target pose 804 is assigned to the second robot 820 for execution.

In the example swim lane diagram shown in FIG. 8C, at step 1, by invoking the projection function implemented by skill B that is associated with target pose 804, the skills adaptation system ("Executive") can obtain a skill footprint which specifies a volume 821 occupied by the robot 820 used to perform skill B.

At step 2, the world modeling system ("World") reserves the volume 821 in the operating environment for skill B by generating a segmentation subset of the skill footprint associated with skill B that identifies the volume 821 for performing skill B and that specifies the requested permissions of skill B to enter the volume 821.

At step 3, the skills adaptation system requests that skill B to be executed on the second robot 820 by calling the execution function. While skill B is executing, the skills adaptation system may also receive a request to enter a volume in the operating environment does not occur in the segmentation subset of the skill footprint. For example, the execution function implemented by skill B may attempt to cross a boundary of the volume 821 in the segmentation subset of the skill footprint associated with skill B. Accordingly, the skills adaptation system denies the request of skill B to constrain the second robot 820 executing skill B to stay within the volume 821.

Figure 9:
FIG. 9 is a flowchart of another example process for executing skills using segmentation subsets of skill footprints.
Figure 9:
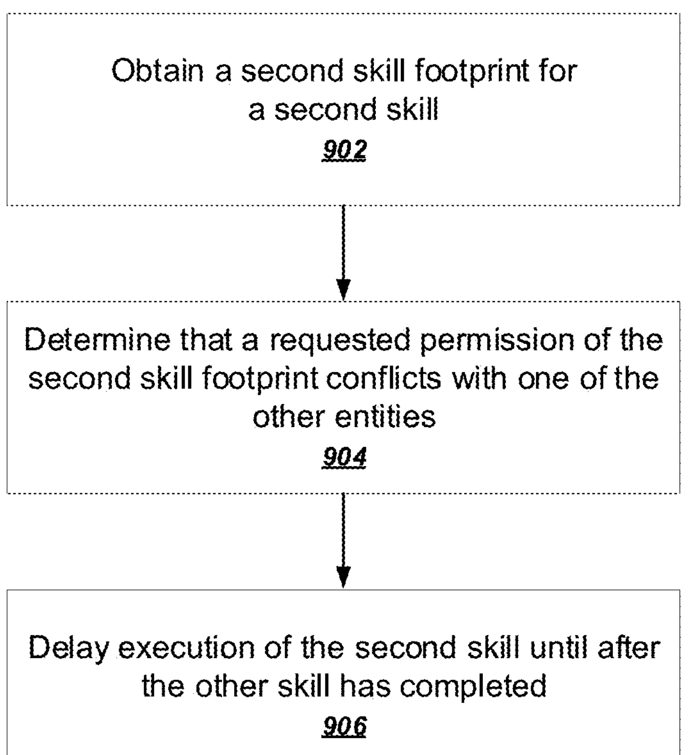

FIG. 9 is a flowchart of another example process 900 for executing skills using segmentation subsets of skill footprints. The process 900 can be performed by a system of one or more computers in one or more locations and programmed in accordance with this specification. For example, the process 900 can be performed by the system 100 shown in FIG. 1. For convenience, the process 900 will be described as being performed by a system of one or more computers.

The system obtains a second skill footprint for a second skill to be executed in the operating environment (902). The second skill may be any skill obtained by the system at step 702 of process 700 that is different from the first skill.

The system determines that a requested permission of the second skill footprint conflicts with one of the other entities automatically added to the segmentation subset of the first skill footprint associated with the first skill (904). For example, the second skill footprint may attempt to read or write the latest world state of a same entity that has already been reserved by the first skill footprint, i.e., already added to the segmentation subset of the first skill footprint associated with the first skill.

In response, the system delays execution of the second skill until after the first skill has completed (906). In some cases, the system can do this by adding a dependency between the first and second skills in a skill plan to be followed by the robot. The skill plan specifies sequential, rather than concurrent, execution of the first and second skills, where the execution of the second skill is dependent upon completion of the execution of the first skill.

Figure 10:
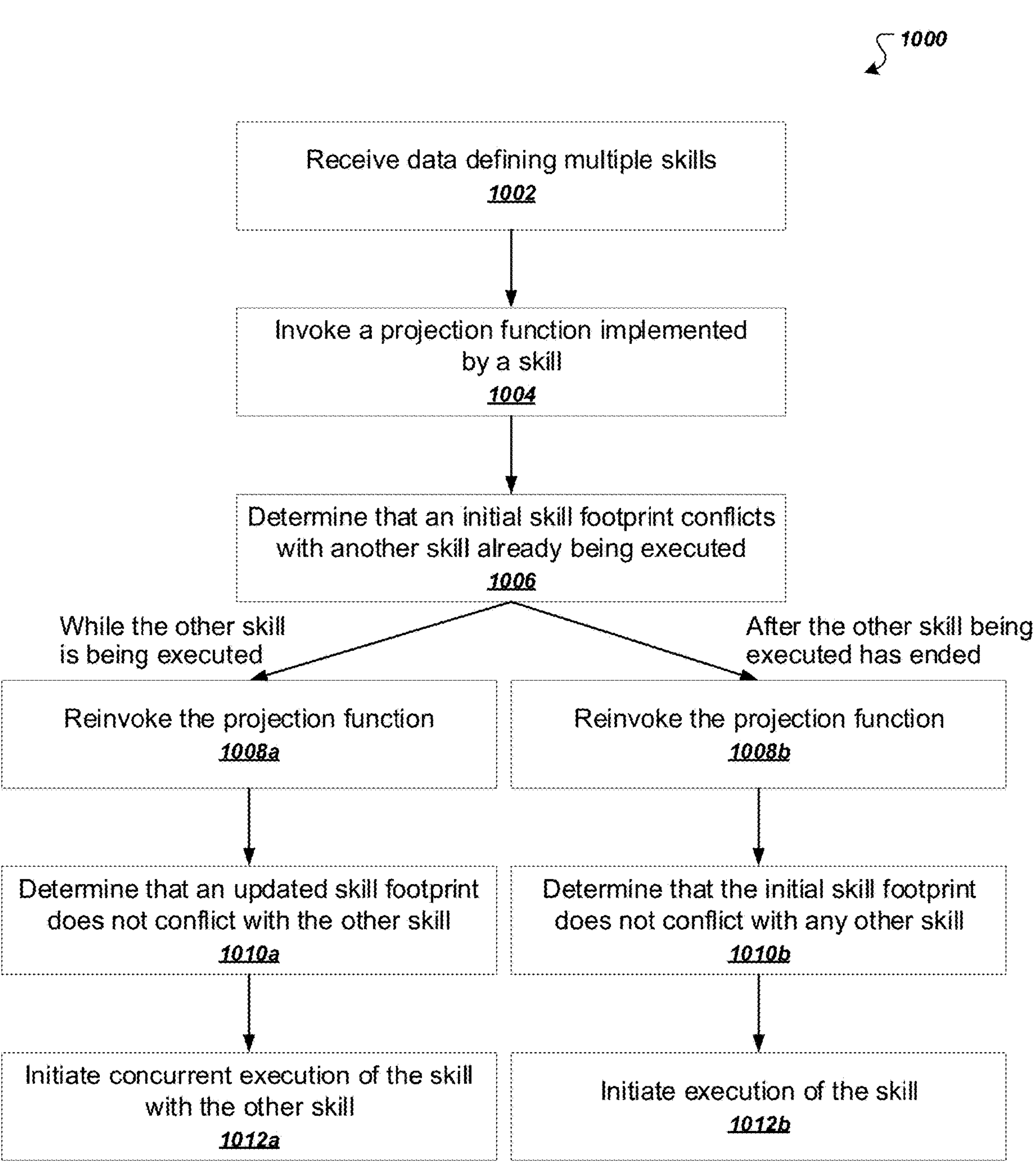
FIG. 10 is a flowchart of an example process for online replanning using skill footprints.

FIG. 10 is a flowchart of an example process 1000 for online replanning using skill footprints. The process 1000 can be performed by a system of one or more computers in one or more locations and programmed in accordance with this specification. For example, the process 1000 can be performed by the system 100 shown in FIG. 1. For convenience, the process 1000 will be described as being performed by a system of one or more computers.

The system receives data defining multiple skills to be performed by one or more robots in an operating environment (1002). The system may receive the skills from a variety of different sources, e.g., equipment manufacturers, product manufacturers, and third-party developers. In various cases, the multiple skills defined in the received data may include a first group of skills that can be executed concurrently. Each skill in the first group of skills can be executed in concurrency with one or more other skills in the first group of skills to improve task execution efficiency, e.g., increase utilization of available resources in the operation environment. In these cases, the system can obtain, i.e., receive or generate, an initial skill plan in which two or more of the first skills have been planned for concurrent execution by respective robots.

In some of these cases, however, skills initially planned for a first operating environment may be replanned and used for execution in a second operating environment that is different from the first operating environment. For example, the first and second operating environments may be different operating environment that have different physical dimensions, different equipment, or both than one another. As another example, the first and second operating environments may be the same operating environment but at different time points, and thus have different physical dimensions, different equipment, or both than one another. In these cases, the subtasks of the skill may need to be effectuated by different motion plans, e.g., due to the local modifications to the operating environment. Correspondingly, the system makes necessary adjustments to the skill plan to ensure conflict-free execution of the multiple skills, e.g., by adjusting an order in which the multiple skills are executed.

Figure 11A:
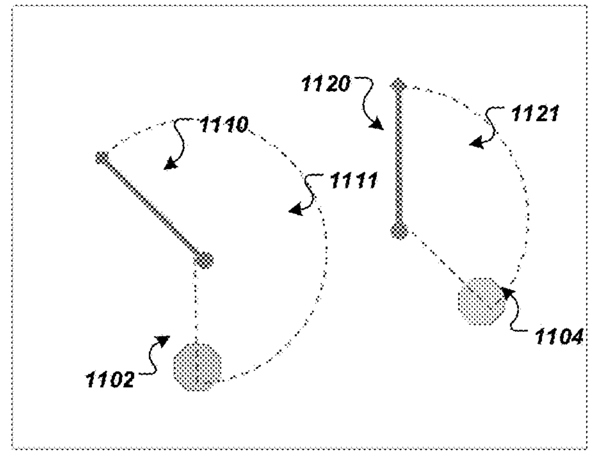
FIGS. 11A-C show example illustrations of online replanning using skill footprints.
Figure 11A:
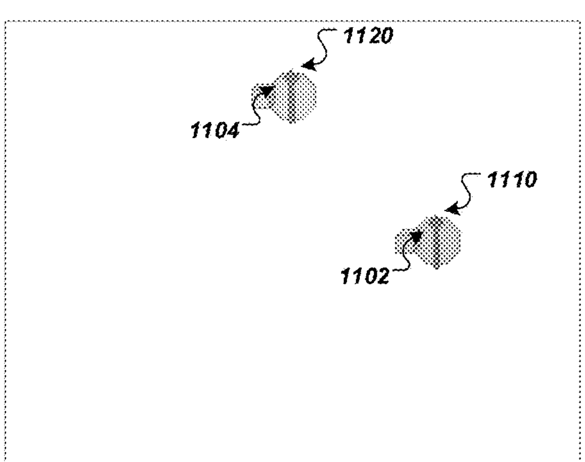
Figure 11B:
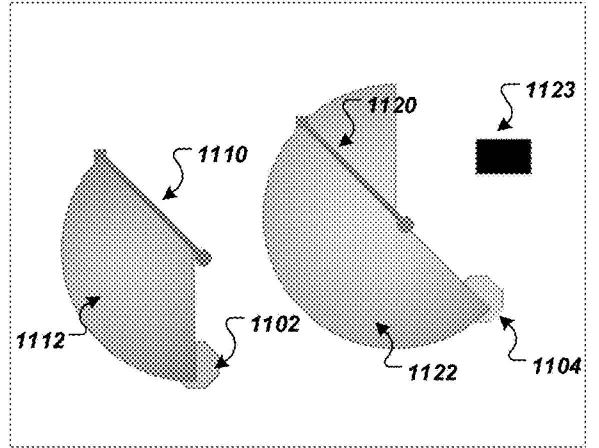
Figure 11B:
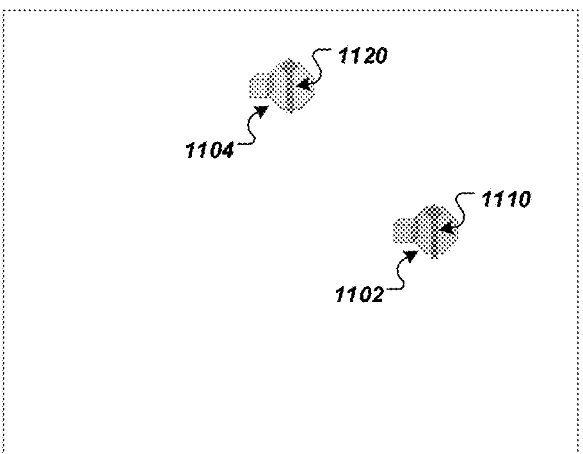
Figure 11C:
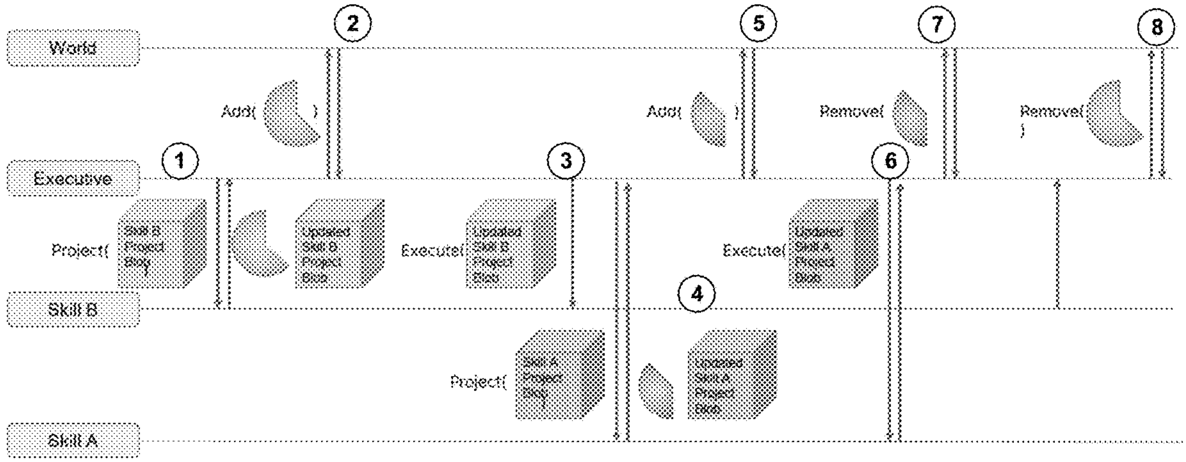

FIGS. 11A-C show example illustrations of online replanning using skill footprints. In the example of FIG. 11, data that defines target pose 1102 and target pose 1104 has been received by the system, and the operating environment includes a first robot 1110 and a second robot 1120. In the initial skill plan, skill A associated with target pose 1102 and skill B associated with target pose 1104 are assigned to the first robot 1110 and the second robot 1120, respectively, for concurrent execution.

In particular, the operating environment shown on the left hand side of FIG. 11A has changed since the skills have been initially planned. As shown on the left hand side of FIG. 11B, the operating environment additionally includes and a new obstacle 1123 (which was not present in the operating environment shown on the left hand side of FIG. 11A).

The system invokes a projection function implemented by a first skill (1004). The first skill may be any skill in the multiple skills defined in the received data. Before the first skill is kicked off for execution, one or more other skills may already be being executed. As described above, the projection function is a skill functionality that simulates execution of a candidate motion plan, e.g., an initial motion plan generated by an online motion planner of the system, in the operating environment and records the results of the simulation. The simulation results include an initial skill footprint specifying a set of resources requested for performing the skill. The resources can include entities included in the operating environment. In some examples, the set of resources can include one or more tools that are required for performing the skill, one or more robots that are required for performing the skill, one or more target objects required for performing the skill, or a combination thereof and possibly more. The initial skill footprint can also specify a spatial volume in the operating environment occupied by a corresponding entity, e.g., the robot, used to perform the skill.

The system determines that an initial skill footprint generated by the projection function conflicts with a skill footprint of another skill already being executed (1006). In particular, the system determines that the initial skill footprints generated by the projection function is in conflict with the skill footprint of the other skill in response to determining that the two skill footprints require a same resource (e.g., a same tool, or a same robot), occupies a same volume, or both with respect to one another.

In the example of FIG. 11, because the skill footprint of skill B associated with target pose 1104 has changed (due to the presence of the new obstacle 1123 in the operating environment), the system determines that the initial skill footprint of skill A associated with target pose 1102 conflicts with the updated skill footprint of skill B. Specifically, the new volume 1122 that will be used by the second robot 1120 that is used to move to target pose 1104 has changed from volume 1121 represented by the initial skill footprint of skill B. Correspondingly, there exists a conflict, i.e., an overlap, between the volume 1122 and the volume 1111 represented by the initial skill footprint of skill A.

In response, the system reinvokes the projection function with data representing the skill footprint of the other skill already being executed (1008*a*). In some cases, the system can do this while the other skill is still in online execution. Upon being reinvoked, the projection function generates an updated skill footprint representing the resources that are required for performing the first skill and an updated volume occupied by a corresponding entity used to perform the first skill. The updated skill footprint can specify a different motion plan than the initial skill footprint.

In some of these cases, the system generates one or more adjusted motion plans by using the online motion planner of the system. The online motion planner can implement planning algorithms that consumes input data representing the skill footprint of the other skill already being executed, data derived from the input data, or both, so as to generate an adjusted motion plan that results in a different skill footprint that does not conflict with the skill footprint of the other skill. For example, online motion planner can generate an adjusted motion plan that causes the robot to avoid a volume occupied by the skill already being executed in the operating environment. The online motion planner can do this using sample generators and based on the equipment available and other local conditions, including the presence of any obstacles in the operating environment, as described in commonly owned U.S. patent application Ser. No. 17/551,706, which is herein incorporated by reference. The online motion planner can also do this based on constraints and input from a footprint constrainer and a path simulator, described in commonly owned U.S. patent application Ser. No. 16/727,024, which is herein incorporated by reference.

The system determines that the updated skill footprint generated by the projection function does not conflict with the other skill currently being executed (1010*a*). In particular, the system determines that the updated skill footprints generated by the projection function does not conflict with the updated skill footprint of the other skill in response to determining that the two skill footprints does not require a same resource (e.g., a same tool, or a same robot) and does not occupy a same volume with respect to one another.

As shown on the left hand side of FIG. 11B, as a result of using a different motion plan to perform skill A, the volume now used by the first robot 1110 that is used to execute skill A has changed from volume 1111 to volume 1112, which no longer conflicts with the updated volume occupied by the second robot 1120 when executing skill B. Correspondingly, in this example, the system determines that the updated skill footprint generated by the projection function for skill A does not conflict with skill B currently being executed.

In response, the system initiates concurrent execution of the first skill with the other skill currently being executed (1012*a*). As shown on the right hand side of FIG. 11B, the system can generate a task plan in the form of a dependency graph which defines no dependency between skill A and skill B, which are assigned to the first robot 1110 and the second robot 1120, respectively, for concurrent execution.

In the example swim lane diagram shown in FIG. 11C, at step 1, during the planning stage, the skills adaptation system ("Executive") calls the projection function implemented in skill B associated with target pose 1104 to request a simulation and to generate the updated skill footprint for skill B, which includes information that specifies a volume 1122 in the operating environment occupied by the second robot 1120 used to perform skill B. Notably, because of the new obstacle 1123 that is now present in the operating environment, the projection function generates the volume 1122 swept through by a path that is different from a path sweeping through the volume 1121 as initially planned to avoid the expected location of the obstacle 1123.

Accordingly, at step 2, the world modeling system ("World") reserves the volume 1122 in the operating environment for skill B by generating a segmentation subset of the skill footprint associated with skill B that identifies the volume 1122 for performing skill B and that specifies requested permissions for the volume 1122. At step 3, the skills adaptation system requests that skill B to be executed on the second robot 1120 by calling the execution function.

At step 4, while skill B is being executed, the skills adaptation system calls the projection function implemented in skill A associated with target pose 1102 to request a simulation and to generate the updated skill footprint for skill A. The updated skill footprint for skill A includes information that specifies a volume 1112 in the operating environment occupied by the first robot 1110 used to perform skill A. Notably, because the volume 1122 in the operating environment has been reserved for skill B, the projection function generates the volume 1112 swept through by a path that is different from a path sweeping through the volume 1111 as initially planned.

Similarly, at steps 5 and 6, the volume 1122 in the operating environment is reserved for skill A, and skill A is executed by using the first robot 1110.

At steps 7 and 8, once the execution has completed, the world modeling system removes the reserved volumes 1112 and 1122 from the segmentation subsets of the skill footprints associated with skill A and skill B, respectively, thereby releasing these resources in the operating environment so that they may be utilized by another skill.

In these cases, by using the described planning techniques the system determines that skill A and skill B can be executed concurrently, despite according to different motion plans, while avoiding conflicting with one another. The system thus generates an updated skill plan (that is similar to the initial skill plan) in which skill A and skill B are executed concurrently by the first robot 1110 and the second robot 1120, respectively.

Alternatively, in other cases, the system reinvokes the projection function after the other skill being executed has ended (1008*b*).

The system then determines that the initial skill footprint does not conflict with any skills currently being executed (1010*b*), and in response, the system initiates execution of the first skill according to the initial footprint instead of the updated footprint (1012*b*). In other words, the system determines that, only after the execution of the other skill currently being executed has ended, the first skill will be subsequently executed according to the initial skill footprint.

Referring back to the example of FIG. 11, in these other cases, the system can wait until after the execution of skill B on the second robot 1120 including moving to target pose 1104 has ended (and reserved resources including volume 1122 has been released) before reinvoking the projection function implemented by skill A and subsequently initiating execution of skill A according to the initial footprint which identifies the initial volume 1111 to be occupied by the first robot 1102 when executing skill A including moving to target pose 1102. In other words, the system generates an updated skill plan in which, unlike the initial skill plan, skill A and skill B are executed subsequently and rather than concurrently by the first robot 1110 and the second robot 1120.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by a least a portion of a robot or tool during the entire execution of a motion plan. The motion swept volume can be generated by collision geometry associated with the robot-tool system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by one or more computers, the method comprising:

receiving data defining multiple skills to be performed by one or more robots in an operating environment;

invoking a projection function implemented by a skill, wherein the projection function generates a skill footprint representing resources requested for performing the skill and a volume occupied by a corresponding entity used to perform the skill;

determining that an initial skill footprint generated by the projection function conflicts with a skill footprint of another skill already being executed; and in response, reinvoking the projection function with data representing the skill footprint of the other skill that is already being executed.

Embodiment 2 is the method of embodiment 1, further comprising:

determining that an updated skill footprint generated by the projection function does not conflict with the other skill already being executed; and in response, initiating concurrent execution of the skill with the other skill already being executed.

Embodiment 3 is the method of embodiment 2, wherein the updated skill footprint is associated with a different motion plan than the initial skill footprint.

Embodiment 4 is the method of any one of embodiments 1-3, further comprising using robot motion plan online adjustment techniques to generate the different motion plan from an initial motion plan associated with the initial skill footprint.

Embodiment 5 is the method of any one of embodiments 2-4, wherein the updated skill footprint specifies a robot avoiding a volume occupied by the skill already being executed.

Embodiment 6 is the method of any one of embodiments 1-5, further comprising:

reinvoking the projection function after the other skill being executed has ended;

determining that the initial skill footprint does not conflict with any skills currently being executed; and in response, initiating execution of the skill according to the initial footprint instead of the updated footprint.

Embodiment 7 is the method of any one of embodiments 1-6, wherein the received data further defines an initial skill plan for executing the multiple skills.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:

receiving skill data defining multiple skills to be executed by multiple robots in an operating environment, wherein the skill data is associated with configuration metadata that assigns one or more of the multiple robots to execute each skill;

invoking a projection function implemented by a skill to be executed by one of the multiple robots that is assigned to execute the skill according to the configuration metadata, wherein the projection function generates a skill footprint representing resources requested for executing the skill and a volume occupied by a corresponding entity used to execute the skill;

determining that an initial skill footprint generated by the projection function conflicts with a skill footprint of another skill that is currently being executed by another one of the multiple robots that is assigned to execute the other skill according to the configuration metadata, wherein the determining comprises determining that a same robot is used by both the skill to be executed and the other skill;

in response, reinvoking the projection function with data representing the skill footprint of the other skill that is currently being executed by the other one of the multiple robots to generate an updated skill footprint;

determining that the updated skill footprint generated by reinvoking the projection function does not conflict with the skill footprint of the other skill that is currently being executed by the other one of the multiple robots; and in response, initiating execution of the skill by the one of the multiple robots that is assigned to execute the skill according to the configuration metadata while the other skill continues to be executed by the other one of the multiple robots that is assigned to execute the other skill according to the configuration metadata.

2. The method of claim 1, wherein the updated skill footprint is associated with a different motion plan than the initial skill footprint.

3. The method of claim 2, further comprising using robot motion plan online adjustment techniques to generate the different motion plan from an initial motion plan associated with the initial skill footprint.

4. The method of claim 1, wherein the updated skill footprint specifies a robot avoiding a volume occupied by the skill that is currently being executed by the other one of the multiple robots.

5. The method of claim 1, further comprising:

reinvoking the projection function after the other skill being executed by the other one of the multiple robots has ended;

determining that the initial skill footprint does not conflict with any skills currently being executed; and in response, initiating execution of the skill by the one of the multiple robots according to the initial footprint instead of the updated footprint.

6. The method of claim 1, wherein the received data further defines an initial skill plan for executing the multiple skills.

7. A system comprising:

one or more computers and one or more storage devices storing instructions that are operable, when executed by the one or more computers, to cause the one or more computers to perform operations comprising:

receiving skill data defining multiple skills to be executed by multiple robots in an operating environment, wherein the skill data is associated with configuration metadata that assigns one or more of the multiple robots to execute each skill;

invoking a projection function implemented by a skill to be executed by one of the multiple robots that is assigned to execute the skill according to the configuration metadata, wherein the projection function generates a skill footprint representing resources requested for executing the skill and a volume occupied by a corresponding entity used to execute the skill;

determining that an initial skill footprint generated by the projection function conflicts with a skill footprint of another skill that is currently being executed by another one of the multiple robots that is assigned to execute the other skill according to the configuration metadata, wherein the determining comprises determining that a same robot is used by both the skill to be executed and the other skill;

in response, reinvoking the projection function with data representing the skill footprint of the other skill that is currently being executed by the other one of the multiple robots to generate an updated skill footprint;

determining that the updated skill footprint generated by reinvoking the projection function does not conflict with the skill footprint of the other skill that is currently being executed by the other one of the multiple robots; and in response, initiating execution of the skill by the one of the multiple robots that is assigned to execute the skill according to the configuration metadata while the other skill continues to be executed by the other one of the multiple robots that is assigned to execute the other skill according to the configuration metadata.

8. The system of claim 7, wherein the updated skill footprint is associated with a different motion plan than the initial skill footprint.

9. The system of claim 8, wherein the operations further comprise using robot motion plan online adjustment techniques to generate the different motion plan from an initial motion plan associated with the initial skill footprint.

10. The system of claim 7, wherein the updated skill footprint specifies a robot avoiding a volume occupied by the skill that is currently being executed by the other one of the multiple robots.

11. The system of claim 7, wherein the operations further comprise:

reinvoking the projection function after the other skill being executed by the other one of the multiple robots has ended;

determining that the initial skill footprint does not conflict with any skills currently being executed; and in response, initiating execution of the skill by the one of the multiple robots according to the initial footprint instead of the updated footprint.

12. The system of claim 7, wherein the received data further defines an initial skill plan for executing the multiple skills.

13. One or more non-transitory computer storage media encoded with computer program instructions that when executed by one or more computers cause the one or more computers to perform operations comprising:

receiving skill data defining multiple skills to be executed by multiple robots in an operating environment, wherein the skill data is associated with configuration metadata that assigns one or more of the multiple robots to execute each skill;

invoking a projection function implemented by a skill to be executed by one of the multiple robots that is assigned to execute the skill according to the configuration metadata, wherein the projection function generates a skill footprint representing resources requested for executing the skill and a volume occupied by a corresponding entity used to execute the skill;

determining that an initial skill footprint generated by the projection function conflicts with a skill footprint of another skill that is currently being executed by another one of the multiple robots that is assigned to execute the other skill according to the configuration metadata, wherein the determining comprises determining that a same robot is used by both the skill to be executed and the other skill;

in response, reinvoking the projection function with data representing the skill footprint of the other skill that is currently being executed by the other one of the multiple robots to generate an updated skill footprint;

determining that the updated skill footprint generated by reinvoking the projection function does not conflict with the skill footprint of the other skill that is currently being executed by the other one of the multiple robots; and in response, initiating execution of the skill by the one of the multiple robots that is assigned to execute the skill according to the configuration metadata while the other skill continues to be executed by the other one of the multiple robots that is assigned to execute the other skill according to the configuration metadata.

14. The computer storage media of claim 13, wherein the updated skill footprint is associated with a different motion plan than the initial skill footprint.

15. The computer storage media of claim 14, wherein the operations further comprise using robot motion plan online adjustment techniques to generate the different motion plan from an initial motion plan associated with the initial skill footprint.

16. The computer storage media of claim 13, wherein the updated skill footprint specifies a robot avoiding a volume occupied by the skill that is currently being executed by the other one of the multiple robots.

17. The computer storage media of claim 13, wherein the operations further comprise:

reinvoking the projection function after the other skill being executed by the other one of the multiple robots has ended;

determining that the initial skill footprint does not conflict with any skills currently being executed; and in response, initiating execution of the skill by the one of the multiple robots according to the initial footprint instead of the updated footprint.

18. The method of claim 1, wherein the configuration metadata specifies, for each skill, a robot model identifier that identifies a robot that will be executing the skill.

19. The method of claim 1, wherein the configuration metadata specifies, for each skill, a location in a world coordinate system of a robot that will be executing the skill.

20. The system of claim 7, wherein the configuration metadata specifies, for each skill, a robot model identifier that identifies a robot that will be executing the skill.

* * * * *